United States Patent [19]

Terasawa et al.

[11] Patent Number: 4,599,625

[45] Date of Patent: Jul. 8, 1986

[54] INK TANK FRANGIBLE LEVER FOR PRESSURE CO-ACTION WITH A INK BAG

[75] Inventors: Koji Terasawa, Mitaka; Akira Miyakawa, Tanashi; Takehiko Kiyohara, Zama, all of Japan

[73] Assignee: Canon Kabushiki Kaisha, Tokyo, Japan

[21] Appl. No.: 713,883

[22] Filed: Mar. 20, 1985

[30] Foreign Application Priority Data

Mar. 30, 1984 [JP] Japan .................................. 59-60588
Mar. 30, 1984 [JP] Japan .................................. 59-60589

[51] Int. Cl.[4] ....................... G01D 15/18; B65D 35/56

[52] U.S. Cl. .................................. 346/140 R; 222/80; 222/95; 222/103; 222/105

[58] Field of Search ............... 346/140 R; 222/80, 95, 222/103, 105

[56] References Cited

U.S. PATENT DOCUMENTS 3,838,796 10/1974 Cohen ................................ 222/105
4,119,034 10/1978 Wax ................................ 101/366 X

OTHER PUBLICATIONS

IBM Technical Disclosure Bulletin, "Constant-Pressure Head Ink Supply", J. Greene, W. Hildenbrand and S. Manning, vol. 15, No. 9, Feb., '73.

*Primary Examiner*—E. A. Goldberg
*Assistant Examiner*—Gerald E. Preston
*Attorney, Agent, or Firm*—Fitzpatrick, Cella, Harper & Scinto

[57] ABSTRACT

An ink tank comprises a deformable ink bag for storing ink provided in a case, wherein a low strength portion is formed in a member constituting said case, and a lever for pressing said ink bag is formed by breaking said low strength portion. An ink-jet recording apparatus comprises a recording head unit having a discharging port for forming a flying droplet by discharging ink, and an ink tank for storing ink supplied to said recording head unit, wherein means for breaking a low strength portion of a case for said ink tank is provided to fixing means for fixing said ink tank in which a deformable ink bag for storing ink is provided in said case, said low strength portion is formed in a member constituting said case, and a lever for pressing said ink bag is formed by breaking said low strength portion.

18 Claims, 10 Drawing Figures

INK TANK FRANGIBLE LEVER FOR PRESSURE CO-ACTION WITH A INK BAG

BACKGROUND OF THE INVENTION

1. Field of the Invention

The present invention relates to an ink tank and an ink-jet recording apparatus having the same and, more particularly, to an ink tank having a mechanism for resolving abnormal ink discharge from a nozzle and an ink-jet recording apparatus having such an ink tank.

2. Description of the Prior Art

In an ink-jet recording apparatus, the recording ink is supplied to a recording head unit from an ink tank. The ink is discharged from a discharging port of a nozzle of the recording head unit so as to form flying droplets for recording an image on a recording medium. One type of ink tank is separate from a recording head unit and supplies ink to a nozzle through a proper ink supply tube. Another type of ink tank is integrally mounted on the recording head unit.

In an ink-jet recording apparatus, dust or bubbles are sometimes introduced in an ink tank or a communicating portion between the tank and the recording head unit. Since the nozzle of the recording head unit has a small inner diameter of only several tens of microns, when dust and bubbles reach the nozzle of the recording head unit, they become attached to the interior of the nozzle and the like, thereby preventing ink flow. This results in degradation in ink discharge efficiency and poor discharge response with respect to recording signals. In a worst case, dust and bubbles clog the nozzle, thus stopping ink discharge. In addition, when ink discharge is not performed for a long period of time with ink remaining in the ink-jet recording apparatus, ink solids are precipitated, thus causing abnormal ink discharge.

For these reasons, the ink discharging capability of the recording head unit must be recovered. In a conventional method, in order to recover the ink discharging capability, the ink discharging port of the recording head unit is externally capped, and obstacles such as dust are removed from the recording head unit by suction. However, with such a method, an ink discharge recoverying device must be provided separately from the recording head unit, and it is difficult to provide a compact recording apparatus. In addition, the ink discharging port and the suction hole of a capping mechanism must be precisely aligned, resulting in difficult assembly. Poor alignment causes damage to the discharging port.

Furthermore, the structure of the apparatus becomes complex, and a low-cost, standard ink-jet recording apparatus cannot be provided.

SUMMARY OF THE INVENTION

The present invention has been made in consideration of the above situation, and its object is to provide an ink tank of high cost-performance which allows realization of a compact recording apparatus and can be easily manufactured and further allows for easy ink discharge recovery and an ink-jet recording apparatus having such an ink tank.

According to an aspect of the present invention, there is provided an ink tank comprising a deformable ink bag for storing ink provided in a case wherein a low strength portion is formed in a member constituting said case, and a lever for pressing said ink bag is formed by breaking said low strength portion.

According to another aspect of the present invention, there is provided an ink-jet recording apparatus comprising a recording head unit having a discharging port for forming a flying droplet by discharging ink, and an ink tank for storing ink supplied to said recording head unit, wherein means for breaking a low strength portion of a case for said ink tank is provided to fixing means for fixing said ink tank in which a deformable ink bag for storing ink is provided in said case, said low strength portion is formed in a member constituting said case, and a lever for pressing said ink bag is formed by breaking said low strength portion.

DETAILED DESCRIPTION OF THE PREFERRED EMBODIMENTS

An ink tank according to an embodiment of the present invention will be described hereinafter with reference to the accompanying drawings.

Figure 1:
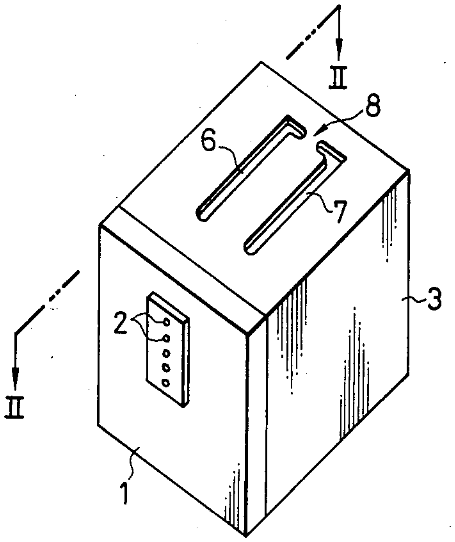
FIG. 1 is a perspective view of an ink tank of an embodiment of the present invention.
Figure 2:
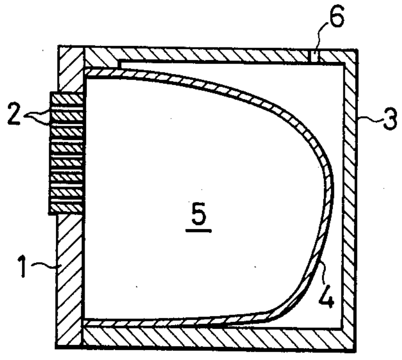
FIG. 2 is a sectional view taken along a line II—II of FIG. 1.

FIG. 1 is a schematic perspective view showing an ink tank according to a first embodiment of the present invention, and FIG. 2 is a sectional view taken along a line II—II thereof. In this embodiment, an ink tank is formed integrally with a recording head unit. Referring to FIG. 1, a nozzle plate 1 of a recording head unit has ink discharging ports 2 formed in a surface thereof and communicating with nozzles. The nozzle plate 1 also serves as a part of a case for the ink tank. The ink tank case 3 is connected to the nozzle plate 1, thus forming a space for storing ink. An ink bag 4 for storing ink is placed in the space. The ink bag 4 stores ink 5, and communicates with the ink discharging ports 2 of the nozzles through a given ink flow path (not shown). Two notches, or slits 6 and 7 are formed in the top surface of the case 3, and end portions thereof oppose each other through a relatively narrow connecting portion 8. Note that in this embodiment, the case 3 is made of a plastic material such as an ABS resin sufficiently resistant to repetitive bending.

Figure 3:
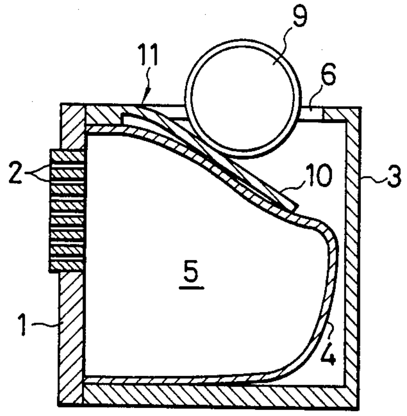
FIG. 3 is a sectional view of the ink tank in an ink discharge recovery operation.

FIG. 3 is a sectional view for explaining an ink discharge recovery operation when abnormal ink discharge occurs in the recording head unit. A portion between the notches 6 and 7 is pushed downward by a coin 9 or the like so as to break the connecting portion 8 of the case 3, thus forming a lever 10. Since the case 3 is made of a material resistant to a bending force, the lever 10 can be pivoted about a focal point 11, thereby pressing the ink bag 4. When the ink bag 4 is pressed, the pressure of the ink 5 is increased and the ink 5 is discharged from the discharging ports 2 at high pressure, thus resolving abnormal ink discharge.

Figure 4:
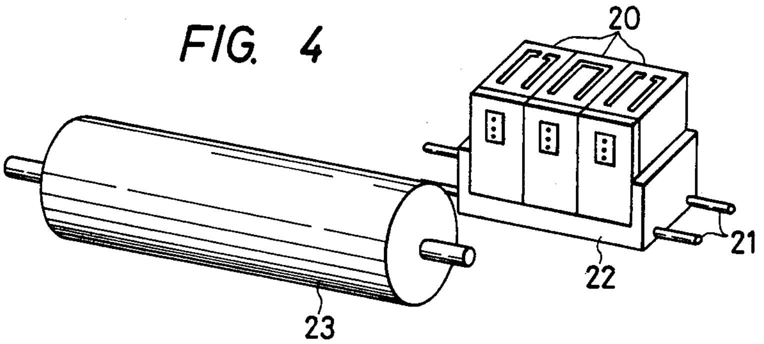
FIG. 4 is a perspective view when the ink tank is used.

FIG. 4 is a perspective view shematically showing a state wherein the ink tank having the above arrangement is loaded on an ink-jet recording apparatus. In FIG. 4, ink tanks 20 according to this embodiment which are formed integrally with the recording head unit are mounted on a carriage 22 movable along sliding shafts 21 fixed to the recording apparatus main body. A platen roller 23 is provided in the recording apparatus main body. FIG. 4 shows a state when an intermediate ink tank among three ink tanks 20 on the carriage 22 is already subject to ink discharge recording operation.

Figure 5:
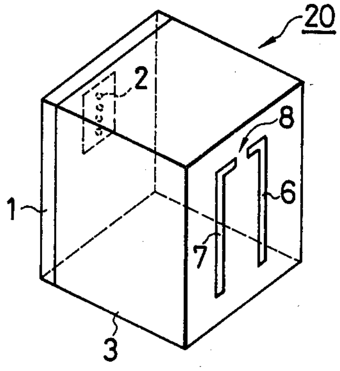
FIG. 5 is a perspective view of an ink tank according to another embodiment of present invention.

FIG. 5 is a schematic perspective view showing an ink tank according to a second embodiment of the present invention. The same reference numerals as in FIG. 1 denote the same parts in FIG. 5. In this embodiment, notches 6 and 7 are provided in a surface of a tank case 3 opposite to that at a nozzle side.

Figure 6:
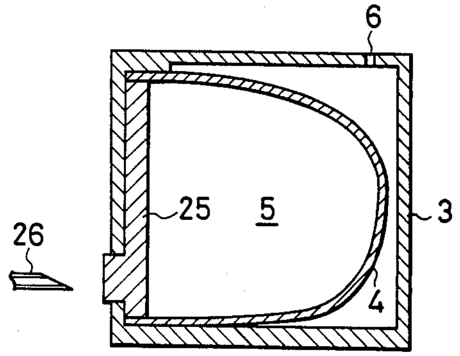
FIG. 6 is a sectional view of an ink tank according to still another of the present invention.

FIG. 6 is a schematic sectional view showing an ink tank according to a third embodiment of the present invention. The same reference numerals as in FIG. 2 denote the same parts in FIG. 6. In this embodiment, an ink tank is provided separately from a recording head unit. An ink bag 4 is provided with a rubber cap 25 partially extending outside a case 3. When a communicating pin 26 provided at a distal end of an ink supply tube is allowed to penetrate the rubber cap 25, the interior of the ink bag 4 is communicated with that of the recording head unit.

In the above embodiments, the portion of the case having lower mechanical strength is constituted by the two notches and the narrow connecting portion formed therebetween. However, the low strength portion can be formed by perforating the case 3, or making a desired portion of the case 3 very thin (e.g., in a groove shape). In addition, the connecting portion is not limited to that formed integrally with the case and can be a separate member. In this case, when a material having a good bending resistance is used, more satisfactory recoverying operation can be achieved. In the above embodiments, only one lever is shown, but a plurality of levers can be provided.

According to an ink tank of the present invention, a simple ink tank which allows easy ink discharge recovery can be obtained, thereby providing a compact recording apparatus. In addition, since the lever is fixed until the low mechanical strength portion of the ink tank is broken so as to perform ink discharge recovery, the ink bag cannot be erroneously pressed, thus preventing contamination of the interior of the apparatus.

Figure 7:
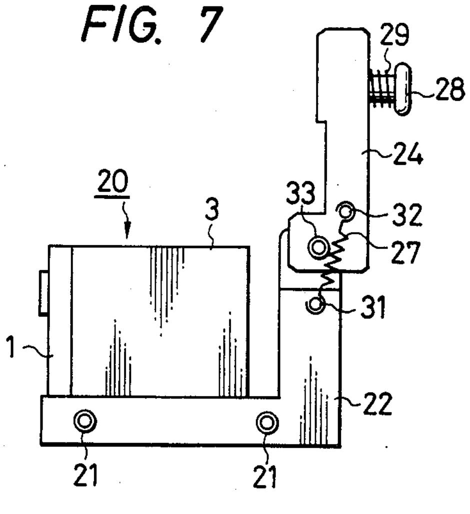
FIGS. 7 and 8 are partial side views of an apparatus according to an embodiment of the present invention.
Figure 8:
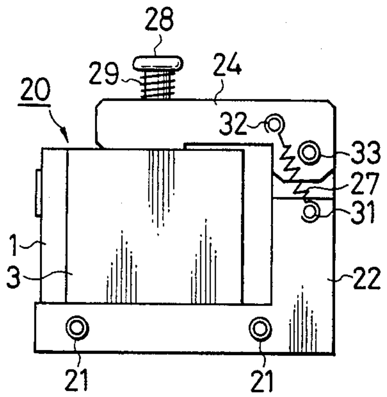

FIGS. 7 and 8 are partial side views of a first embodiment of an ink-jet recording apparatus according to the present invention. An ink tank shown in FIGS. 1 and 2 is used in the apparatus. In FIG. 7, an ink tank 20 comprises an orifice plate (or nozzle plate) 1 and an ink tank case 3 as in FIG. 1. The ink tank 20 is mounted on a carriage 22 movable along sliding shafts 21 fixed to the recording apparatus main body. An ink tank fixing means 24 is provided at a back portion of the carriage 22 through a pin 33 (i.e., at a side opposite to the nozzle plate 1 side of the ink tank 20). The ink tank fixing means 24 can be pivoted about the pin 33. Pins 31 and 32 are provided respectively on the carriage 22 and the ink tank fixing means 24, and two ends of a stretched coil spring 27 are hooked on the pins 31 and 32. A push button 28 is provided to the ink tank fixing means 24.

FIG. 8 shows a state wherein the ink tank fixing means (fixing member) 24 in FIG. 7 is pivoted about the pin 33 so as to fix the ink tank 20.

Figure 9:
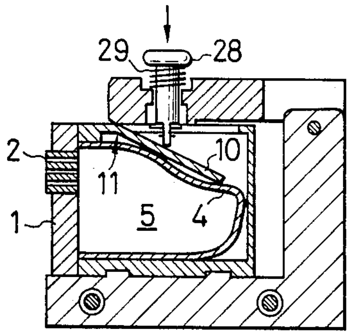
FIG. 9 is a sectional view of the apparatus in the ink injection recovery operation.

FIG. 9 is a sectional view for explaining the discharge recovery operation when abnormal ink discharge occurs. As shown in FIG. 9, the push button 28 as a push member constituting a breaking means used for breaking the low mechanical strength portion is biased upward by a compression coil spring 29 so as to be the locked at a predetermined position. When the push button 28 is pressed downward by hand, a connecting portion 8 of the ink tank case is broken, thus forming a lever 10. The button 28 of the fixing member 24 is provided at a position corresponding to that between notches 6 and 7 of the ink tank 20. Since the case 3 is resistant to the bending force, the lever 10 can be pivoted about a focal point 11, thereby pressing an ink bag 4. When the ink bag 4 is pressed, the pressure of ink 5 is increased. Thus, the ink 5 is discharged from an ink discharging port 2 at high pressure, thereby recovering ink discharge of the recording head unit.

Figure 10:
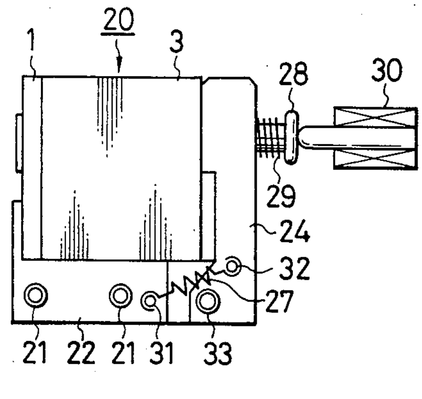
FIG. 10 is a partial side view of an apparatus according to another embodiment of the present invention.

FIG. 10 is a partial side view showing a second embodiment of an ink-jet recording apparatus according to the present invention. Note that an ink tank 20 shown in FIG. 5 is used in the apparatus. The same reference numerals as in FIGS. 7 and 8 denote the same parts in FIG. 10. In this embodiment, a push button 28 is driven by a solenoid 30. The ink discharge recoverying operation of the nozzles by means of the apparatus of this embodiment can be performed in the same manner as in the first embodiment.

In the above embodiments of the recording apparatus, the ink discharge recoverying operation of the ink tank which is formed integrally with the recording head unit has been described. However, even when the ink tank is separately provided from the recording head unit as shown in FIG. 6, the same ink tank fixing means can be formed at the recording apparatus main body side.

A fixing means for fixing a plurality of ink tanks in parallel at the apparatus main body side can be formed.

When the ink tank and the recording head unit are separately provided, they can be separately fixed to the apparatus main body, or they can be fixed after being formed integrally with each other.

Furthermore, in the above embodiments, the low strength portion constituted by the two notches and the narrow connecting portion formed therebetween is shown. However, the low mechanical strength portion can be formed by perforating the case 3, or making a desired portion of the case 3 very thin (e.g., in a groove shape).

According to the present invention, an ink tank capable of easy recovery of ink discharge capability can be obtained with a simple constitution, and a compact recording apparatus can be realized. Furthermore, since the lever is fixed until the low mechanical strength portion of the ink tank is broken so as to perform ink discharge recovery, the ink bag will not be erroneously pressed. Furthermore, since the ink discharge recovery operation can be performed without directly handling the ink tank, the ink tank fixing position will not be shifted by the above operation and this feature becomes more advantageous when the ink tank is formed integrally with the recording head unit.

What is claimed is:

1. An ink tank comprising a deformable ink bag for storing ink provided in a case, wherein a low strength portion is formed in a member constituting said case, and a lever for pressing said ink bag is formed by breaking said low strength portion.

2. An ink tank according to claim 1, wherein said case is made of a plastic material.

3. An ink tank according to claim 1, wherein said low strength portion comprises a plurality of notches and at least one connecting portion provided therebetween.

4. An ink tank according to claim 3, wherein a thickness of said connecting portion is smaller than that of said case.

5. An ink tank according to claim 3, wherein said connecting portion is separately provided from said case.

6. An ink tank according to claim 1, wherein said lever constitutes a portion of said case.

7. An ink tank according to claim 1, wherein said low strength portion is a groove provided in said case.

8. An ink-jet recording apparatus comprising a recording head unit having a discharging port for forming a flying droplet by discharging ink, and an ink tank for storing ink supplied to said recording head unit, wherein means for breaking a low strength portion of a case for said ink tank is provided to fixing means for fixing said ink tank in which a deformable ink bag for storing ink is provided in said case, said low strength portion is formed in a member constituting said case, and a lever for pressing said ink bag is formed by breaking said low strength portion.

9. An apparatus according to claim 8, wherein said case is made of a plastic material.

10. An apparatus according to claim 8, wherein said low strength portion comprises a plurality of notches and at least one connecting portion provided therebetween.

11. An apparatus according to claim 10, wherein a thickness of said connecting portion is smaller than that of said case.

12. An apparatus according to claim 10, wherein said connecting portion is separately provided from said case.

13. An apparatus according to claim 8, wherein said lever constitutes a portion of said case.

14. An apparatus according to claim 8, wherein said low strength portion is a groove provided in said case.

15. An apparatus according to claim 8, wherein said breaking means comprises a press member and a spring member.

16. An apparatus according to claim 8, wherein said recording head unit and said ink tank are formed integrally with each other.

17. An apparatus according to claim 8, wherein said recording head unit and said ink tank are separately provided and separately fixed at a main body side of said apparatus.

18. An apparatus according to claim 8, wherein said recording head unit and said ink tank are separately provided and are fixed at a main body side of said apparatus after being formed integrally with each other.

* * * * *

UNITED STATES PATENT AND TRADEMARK OFFICE
CERTIFICATE OF CORRECTION

PATENT NO. : 4,599,625

DATED : July 8, 1986

INVENTOR(S) : KOJI TERASAWA ET AL.

It is certified that error appears in the above-identified patent and that said Letters Patent is hereby corrected as shown below:

Column 1, line 46, change "recoverying device" to --recovery device--;
line 50-51, change "resulting in difficult assembly" to --causing assembly difficulties--; and
line 51, change "alignment causes" to --alignment also causes--.

Column 2, line 68, change "focal point" to --fulcrum--.

Column 3, line 5, change "shematically" to --schematically--; and
line 43, change "recoverying" to --recovery--.

Column 4, line 11, delete "the";
line 19, change "focal point" to --fulcrum--;
line 20, change "pressure of ink" to --pressure on the ink--;
line 30, change "recoverying" to --recovery--; and
line 35, change "recoverying" to --recovery--.

Signed and Sealed this

Third Day of February, 1987

*Attest:*

DONALD J. QUIGG

*Attesting Officer* *Commissioner of Patents and Trademarks*